(12) United States Patent
Sugino

(10) Patent No.: US 9,612,159 B2
(45) Date of Patent: Apr. 4, 2017

(54) INFRARED SENSOR AND INFRARED SENSOR ARRAY

(71) Applicant: Mitsubishi Electric Corporation, Tokyo (JP)

(72) Inventor: Takaki Sugino, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/840,320

(22) Filed: Aug. 31, 2015

(65) Prior Publication Data
US 2016/0290870 A1    Oct. 6, 2016

(30) Foreign Application Priority Data
Mar. 31, 2015 (JP) .................................. 2015-070858

(51) Int. Cl.
*G01J 5/02* (2006.01)
*G01J 5/08* (2006.01)
(Continued)

(52) U.S. Cl.
CPC ............. *G01J 5/0853* (2013.01); *G01J 5/045* (2013.01); *G01J 5/06* (2013.01); *G01J 5/0818* (2013.01);
(Continued)

(58) Field of Classification Search
CPC .. G01J 5/20; G01J 5/023; G01J 5/0818; G01J 5/0853
(Continued)

(56) References Cited

U.S. PATENT DOCUMENTS 5,962,854 A * 10/1999 Endo .................... G01J 5/02
250/338.1
2007/0215808 A1    9/2007 Sekiguchi et al.
(Continued)

FOREIGN PATENT DOCUMENTS

JP    2162220 A    6/1990
JP    355531 U    5/1991
(Continued)

OTHER PUBLICATIONS

Communication dated Sep. 6, 2016, issued by the Japanese Patent Office in corresponding Japanese Application No. 2015-070858.
(Continued)

*Primary Examiner* — David Porta
*Assistant Examiner* — Meenakshi Sahu
(74) *Attorney, Agent, or Firm* — Sughrue Mion, PLLC; Richard C. Turner

(57) ABSTRACT

An infrared sensor includes: a package; an infrared detecting element formed on the package, the infrared detecting element including a thermal detector and an absorber formed on the thermal detector which is configured to absorb infrared light rays of a specific wavelength that are detected by conversion of the infrared light rays into heat; and a cap formed on the package to cover the infrared detecting element, the cap including: a body having front and rear surfaces, through which the infrared light rays transmit; and a shielding film, with a window formed therein, provided on at least one of the front and rear surfaces of the body, the infrared light rays being reflected by the shielding film other than a portion of the shielding film having the window, and every one of the infrared light rays passing through the window of the cap impinging on the absorber.

14 Claims, 6 Drawing Sheets

(51) Int. Cl.
*G01J 5/10* (2006.01)
*G01J 5/20* (2006.01)
*G01J 5/04* (2006.01)
*G01J 5/06* (2006.01)
*G01J 5/34* (2006.01)

(52) U.S. Cl.
CPC ............ *G01J 5/0831* (2013.01); *G01J 5/0875* (2013.01); *G01J 5/10* (2013.01); *G01J 5/20* (2013.01); *G01J 2005/345* (2013.01)

(58) Field of Classification Search
USPC ........................................ 250/339.02, 339.01
See application file for complete search history.

(56) References Cited

U.S. PATENT DOCUMENTS

| | | | | |
|---|---|---|---|---|
| 2010/0206380 | A1* | 8/2010 | Lindquist | B82Y 10/00 136/261 |
| 2012/0097415 | A1* | 4/2012 | Reinert | H01L 27/14618 174/50 |
| 2014/0226021 | A1* | 8/2014 | Koechlin | G01J 5/08 348/165 |

FOREIGN PATENT DOCUMENTS

| | | |
|---|---|---|
| JP | 5133803 A | 5/1993 |
| JP | 5157625 A | 6/1993 |
| JP | 915040 A | 1/1997 |
| JP | 2007-248382 A | 9/2007 |
| JP | 2011-095137 A | 5/2011 |

OTHER PUBLICATIONS

Communication dated Feb. 23, 2016, from the Japanese Patent Office in counterpart application No. 2015-070858.
Takeshi Tanaka et al., "THz-Wave Filters Using Surface Periodic Structures Composed of the Metal Films", Research Center for Integrated Quantum Electronics, Hokkaido University, 2004, vol. 104, pp. 51-56.

* cited by examiner

INFRARED SENSOR AND INFRARED SENSOR ARRAY

BACKGROUND OF THE INVENTION

1. Field of the Invention

The present disclosure is related to an infrared sensor and an array thereof, and more particularly, to a wavelength selective thermal type infrared sensor and an array thereof.

2. Description of the Related Art

A conventional wavelength selective thermal type infrared sensor has an optical filter, provided on an infrared detector, to detect infrared light rays of a specific wavelength. An optical filter which transmits infrared light rays of a specific wavelength by the use of plasmon resonance is used as an optical filter, for instance (See especially JP 2007-248382 A).

SUMMARY OF THE INVENTION

A conventional wavelength selective thermal type infrared sensor using an optical filter has the following problems. Firstly, the structure of the infrared sensor becomes complex, since the optical filter is provided in addition to an infrared detector. Secondly, the detection efficiency decreases, since a part of the infrared light rays is absorbed during the rays passing through the optical filter. Thirdly, the detection efficiency depends on the incident angle of the infrared light ray, since the amount of the infrared light rays passing through the optical filter depends on the incident angle of the infrared light rays. And fourthly, a plurality of optical sensors having transparency of different wavelength are provided to detect a plurality of infrared light rays in different wavelength regions.

With regard to these problems, instead of an infrared sensor with an optical filter, a thermal type infrared sensor has been studies. The thermal type infrared sensor includes a periodically repeating structure on an infrared detector for generating plasmon resonance of infrared light rays of a specific wavelength to increase the absorption of the infrared light rays of the specific wavelength.

The thermal type infrared sensor, however, has a problem of decreasing the sensitivity (S/N ratio) of the infrared sensor, because the infrared light lays impinge on the side surface of the infrared detector having no periodically repeating structure and also on the support legs, resulting in the absorption of the infrared light lays having a wavelength other than the specific wavelength.

The object of the present disclosure is to provide a high-sensitivity thermal type infrared sensor in which an absorber for infrared light rays having a specific wavelength is formed on the infrared sensor instead of an optical filter. Accordingly, the absorption of infrared light rays having a wavelength other than the specific wavelength can be prevented.

The present disclosure an infrared sensor for detecting infrared light rays of a specific wavelength, the infrared sensor including:
a) a package;
b) an infrared detecting element formed on the package, the infrared detecting element including:
a thermal detector; and
an absorber formed on the thermal detector which is configured to absorb infrared light rays of a specific wavelength, wherein the infrared light rays of the specific wavelength are detected by the conversion of the infrared light rays into heat; and
c) a cap formed on the package to cover the infrared detecting element, the cap including:
a body having a front and rear surfaces, through which the infrared light rays transmit; and
a shielding film, with a window formed therein, provided on at least one of the front and rear surfaces of the body, wherein the infrared light rays are reflected on the shielding film other than the portion of the window, wherein
every one of the infrared light rays passing through the window of the cap impinge on the absorber.

The present disclosure is also an infrared sensor for detecting infrared light rays of a specific wavelength, the infrared sensor including:
a) a package;
b) an infrared detecting element formed on the package, the infrared detecting element including:
a thermal detector; and
an absorber formed on the thermal detector which is configured to absorb infrared light rays of a specific wavelength, wherein the infrared light rays of the specific wavelength are detected by the conversion of the infrared light rays into heat;
c) a shielding structure, with a window formed therein, covering the infrared detecting element, wherein the infrared light rays pass through the window; and
d) a cap formed on the package to cover the shielding structure, wherein
every one of the infrared light rays passing through the window of the shielding structure impinge on the absorber.

Furthermore, the present disclosure is an infrared sensor array in which the infrared sensors are arranged in a matrix format.

According to the infrared sensors of the present disclosure, the infrared light rays other than those wanted to be detected will not be absorbed by the infrared detecting element. Therefore, the thermal detector of the infrared detecting element with high sensitivity can be realized.

DETAILED DESCRIPTION OF THE PREFERRED EMBODIMENTS

Embodiment 1

Figure 1:
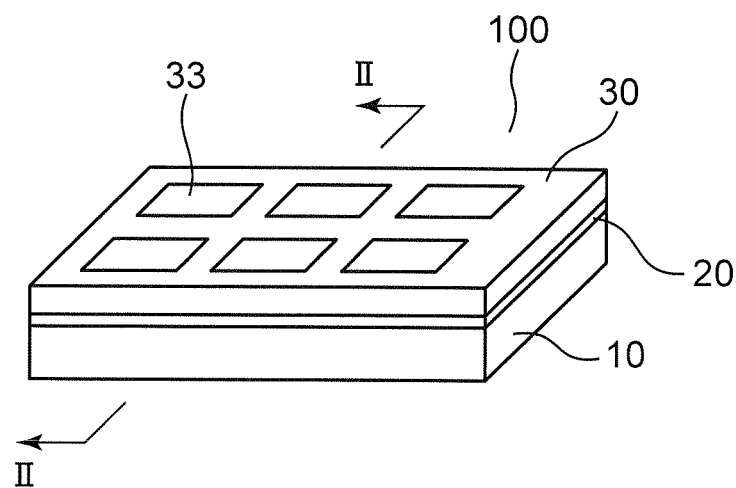
FIG. 1 is a perspective view of a wavelength selective infrared sensor according to embodiment 1 of the present disclosure.
Figure 2:
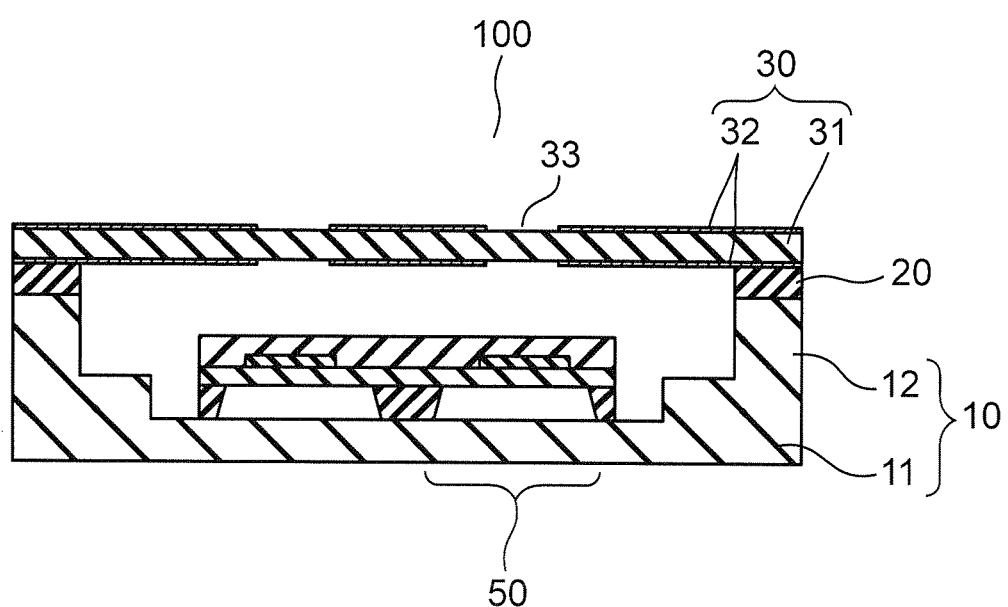
FIG. 2 is a cross sectional view of the wavelength selective infrared sensor taken along line II-II in FIG. 1.

FIG. 1 is a perspective view of a wavelength selective infrared sensor according to embodiment 1 of the present disclosure, generally denoted at 100. FIG. 2 is a cross sectional view of the wavelength selective infrared sensor 100 taken along line II-II shown in FIG. 1.

As illustrated in FIGS. 1 and 2, the wavelength selective infrared sensor 100 includes a package 10 having a bottom portion 11 and a side wall portion 12 and formed of a ceramic material such as aluminum oxide. A cap 30 is fixed on the package 10 by an adhesive material such as a solder, a resin or a silver paste. The cap 30 includes a body 31 which transmits infrared light rays and a shielding film 32 which is formed on the front and rear surfaces of the body and transmits no infrared light rays. The body 31 is formed of silicon or germanium, for instance. The shielding film 32 is formed of a metal such as aluminum or gold. A portion of the body 31 which is not covered by the shielding film 32 serves as a transmission window 33 for an infrared light ray.

The transmission window 33 is formed by selective etching of the shielding film 32 using photolithographic technique after forming the shielding film 32 on the front and rear surfaces of the body 31 by evaporation or sputter. Instead, the shielding films 32 may be formed selectively on the body 31 by evaporation or sputter using a metal mask.

Figure 3:
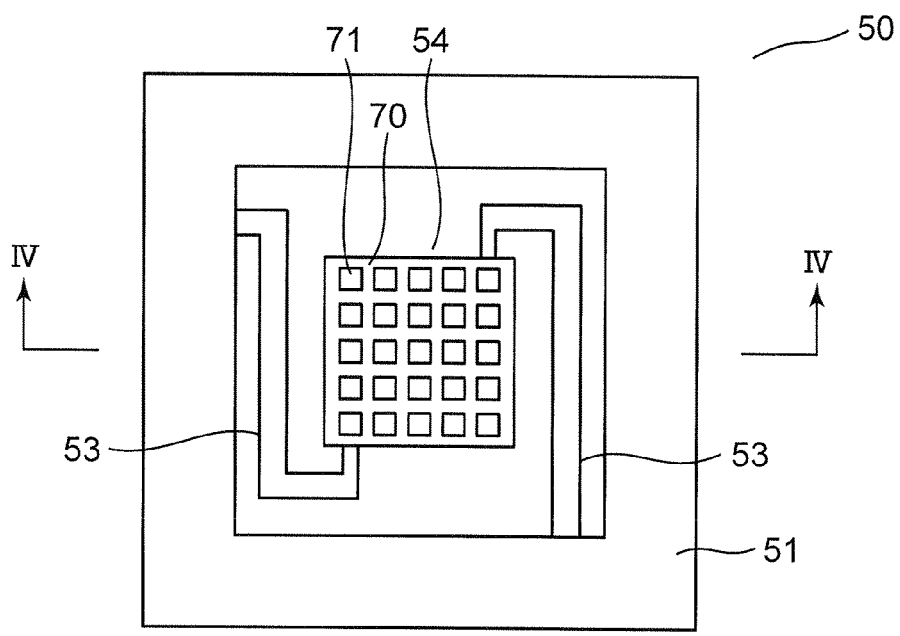
FIG. 3 is a plane view of the wavelength selective infrared detecting element of FIG. 1.
Figure 4:
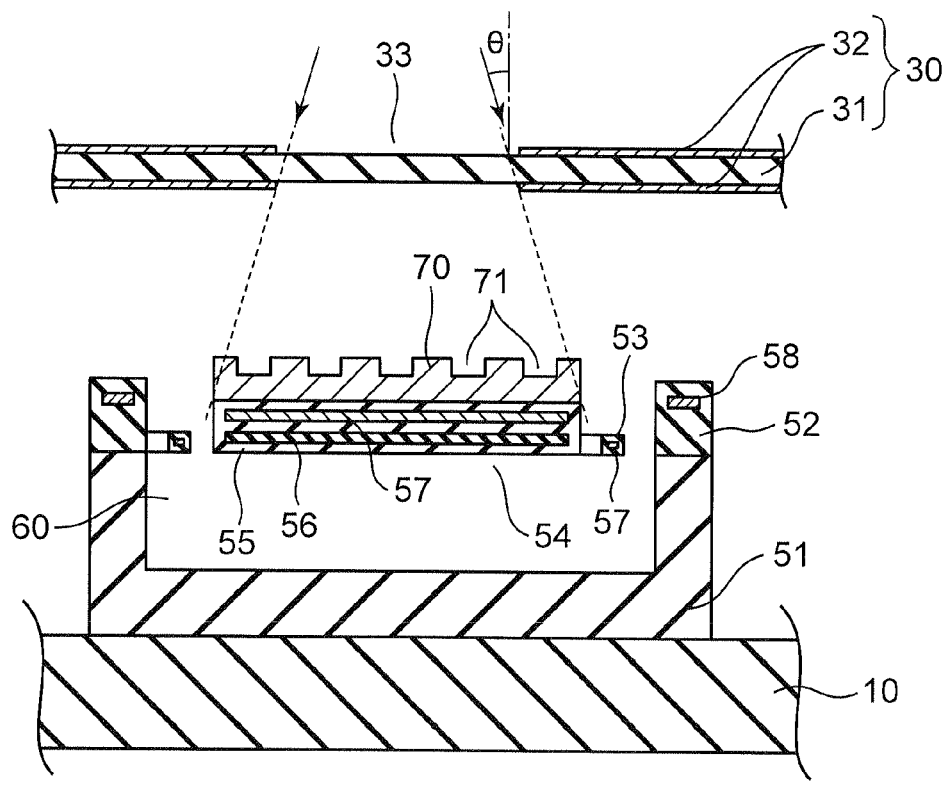
FIG. 4 is a cross sectional view of the wavelength selective infrared detecting element taken along line IV-IV in FIG. 3.

As illustrated in FIG. 2, a wavelength selective infrared detecting element 50 is formed on the bottom portion 11 of the package 10. Although FIG. 2 shows two infrared detecting elements 50 formed side by side on the bottom portion 11, the number of the infrared detecting elements 50 is not limited to two. It is noted that FIG. 2, as well as FIGS. 5-11, shows a schematic view of the infrared detecting elements 50, and the detail of the infrared detecting elements 50 is illustrated in FIGS. 3 and 4. The wavelength selective infrared detecting element 50 is filled with an inert gas or the like, and then sealed.

FIG. 3 is a plane view of the wavelength selective infrared detecting element generally denoted at 50, and FIG. 4 is a cross sectional view thereof taken along line IV-IV shown in FIG. 3. The wavelength selective infrared detecting element 50 is a thermal type infrared sensor such as a resistance type bolometer sensor of vanadium oxide ($VO_x$) or a SOI diode type bolometer sensor using thermal behavior of a PN diode.

The infrared detecting element 50 includes a substrate 51 of silicon, for instance. The substrate 51 has a concavity 60. A thermal detector 54 is supported over the concavity 60 by two supporting legs 53.

The thermal detector 54 is formed of a dielectric material such as silicon oxide, and includes a detecting film 56 and a wire layer 57 connected to the detecting film which are embedded in the dielectric material. The detecting film 56 may be a vanadium oxide ($VO_x$) film forming a bolometer or a crystalline silicon layer forming a pn junction, for instance. The wire layer 57 is formed of a titanium alloy, for instance.

The supporting leg 53 is formed of silicon oxide, for instance, and includes a wire layer 57 embedded in the silicon oxide supporting leg. On the substrate 51 surrounding the concavity 60, a dielectric layer 52 of silicon oxide for instance is formed. A wire layer 58 of aluminum for instance is formed in the dielectric layer 52. A detecting film 56 is connected to a wire layer 58 through the wire layer 57. The electric signal detected by the detecting film 56 is transmitted to an external element through the wire layers 57 and 58.

On the thermal detector 54, an absorber 70 is formed. The absorber 70 is formed of a metal film having periodically aligned concave portions 71, where an infrared light ray having a particular resonance wavelength is selectively absorbed based on surface plasmon resonance. The concave portions 71 do not extend to the other side of the metal film, and are arranged in one direction or in orthogonal directions.

The absorber is formed of a metal film such as gold, silver or aluminum, where surface prasmon resonance is easily generated. When an infrared light ray having a wavelength of 10 μm is absorbed, the concave portions 71, each having a side length of 6 μm and a depth of 1.5 μm, are arranged in a matrix format with a repeating period length of 10 μm, for instance. The horizontal sectional view of the concave portion 71, which is shown as a square, may be a circle, a rectangle, an ellipse or the like.

As illustrated in FIG. 4, the transmission window 33 is formed in the cap 30 so that every one of the infrared light rays passing through the transmission window 33 impinge on the absorber 70, when the package 10 with the infrared detecting element 50 thereon is covered by the cap 30. That is the transmission window 33 is so designed that incident infrared light rays with a critical angle θ (an incident light rays with an incident angle more than angle θ is totally reflected) passing through the edge of the transmission window 33 impinge on the absorber 70.

In the wavelength selective infrared sensor 100 according to embodiment 1 of the present disclosure, the cap 30 with the transmission window 33 is formed on the package 10, so that every one of the infrared light rays passing through the transmission window 33 impinge on the absorber 70 formed on the thermal detector 54, and do not impinge on the side wall of the thermal detector 54 nor on the supporting leg 53. Thus no infrared light rays will be absorbed on the side wall of the thermal detector 54 nor on the supporting leg 53, only the infrared light ray of the specific wavelength is absorbed by the absorber 70.

Consequently a high-sensitivity wavelength selective infrared sensor 100 with improved S/N ratio can be provided which eventually reduces noise signal components caused by the absorption of the unwanted infrared light rays having wavelength other than the specific wavelength.

Furthermore, a wavelength selectivity infrared sensor of low cost and simple structure can be provided, since complex MEMS technology is not used in the manufacturing process, and no optical filter is used. The detection efficiency does not depend on the incident angle, since no optical filter is used.

Figure 5:
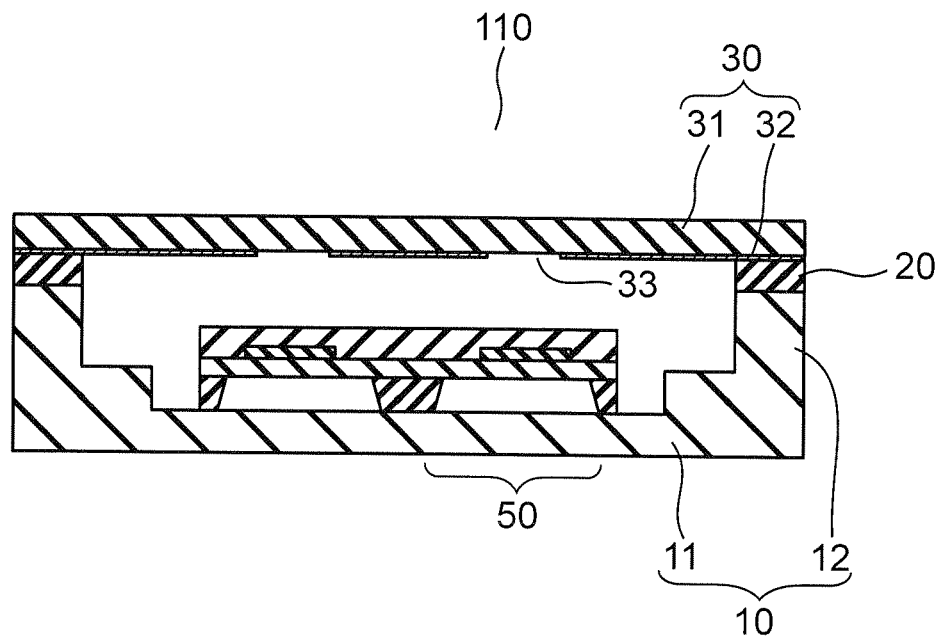
FIG. 5 is a cross sectional view of another wavelength selective infrared sensor according to embodiment 1 of the present disclosure.
Figure 6:
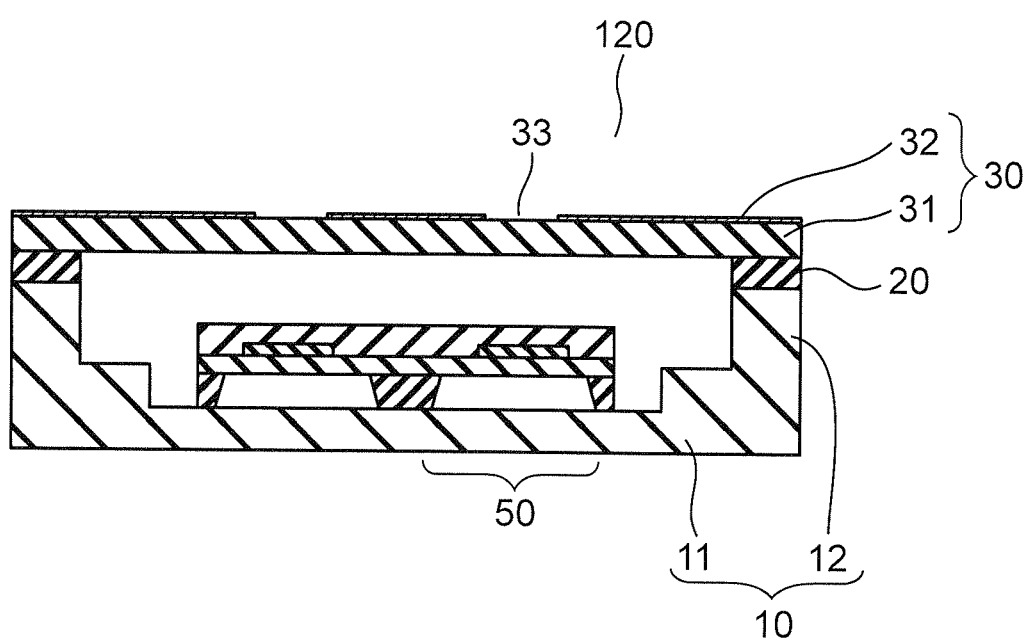
FIG. 6 is a cross sectional view of another wavelength selective infrared sensor according to embodiment 1 of the present disclosure.

FIGS. 5 and 6 are cross sectional views of variations of wavelength selective infrared sensors according to embodiment 1 of the present disclosure, generally denoted by 110 and 120 respectively. In FIGS. 5 and 6, the same numerals as those used in FIG. 2 denote the same or corresponding elements.

In the wavelength selective infrared sensor 110, only the rear surface of the body 31 of the cap 30 is partially covered by the shielding film 32, and the transmission window 33 for infrared light rays is defined by a portion where no shielding film 32 is formed. In the wavelength selective infrared sensor 120, only the front surface of the body 31 of the cap 30 is partially covered by the shielding film 32, and the transmission window 33 for infrared light rays is defined by a portion where no shielding film 32 is formed.

In the wavelength selective infrared sensors 110 and 120, every one of the infrared light rays passing through the transmission window 33 impinges on the absorber, and does not impinge on the side wall of the thermal detector nor on the supporting leg. Consequently high-sensitivity wavelength selective infrared sensors 110 and 120 with improved S/N ratio can be provided which eventually reduces noise signal components caused by the absorption of the unwanted infrared light rays having wavelength other than the specific wavelength.

In FIG. 1, although the infrared sensor array is formed by the infrared detecting elements 50 of FIG. 3 aligned in a 2×3 matrix format, the infrared sensor array may be formed by the infrared detecting elements of other structure of the present disclosure. A plurality of infrared light rays having different wavelength can be simultaneously detected by the infrared detecting elements having different ranges of wavelength sensitivity arranged in a matrix format.

Embodiment 2

Figure 7:
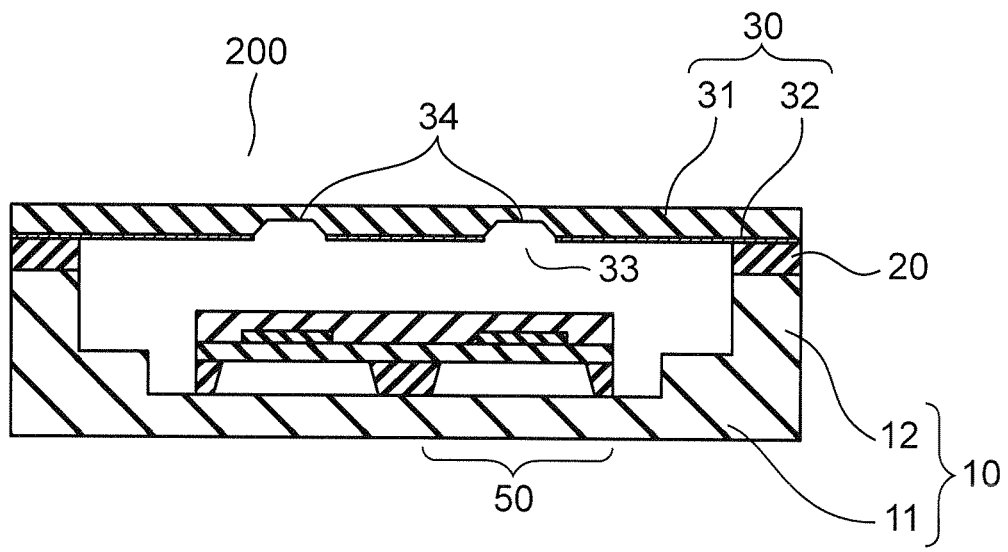
FIG. 7 is a cross sectional view of a wavelength selective infrared sensor according to embodiment 2 of the present disclosure.

FIG. 7 is a cross sectional view of a wavelength selective infrared sensor according to embodiment 2 of the present disclosure, generally denoted by 200. In FIG. 7, the same numerals as those used in FIG. 2 denote the same or corresponding elements.

The wavelength selective infrared sensor 200, in comparison with the wavelength selective infrared sensor 110 of embodiment 1, has a recess 34 formed in the transmission window 33 of the body 31 so as to decrease the thickness thereof.

The recess 34 is formed through the step of etching the body 31 with the shielding film 32 used as an etching mask. When the body 31 is made of silicon, the recess 34 can be formed by the wet etching using TMAH (Tetra Methyl Ammonium Hydroxide) solution as an etching solution.

The wavelength selective infrared sensor 200 according to embodiment 2 of the present disclosure has the body 31 whose thickness is decreased in the transmission window 33. Thereby, the amount of infrared absorption during the infrared light rays passing through the body 31 is decreased, so that the infrared transmittance can be increased. Consequently the high-sensitivity infrared sensor 200 can be obtained.

It is noted that, in the optical sensor 200, every one of the infrared light rays passing through the transmission window 33 impinges on the absorber formed on the thermal detector of the infrared detecting elements 50, and does not impinge on the side wall of the thermal detector nor on the supporting leg. The recess 34 may be formed in the body of other infrared sensors 100 and 120.

Embodiment 3

Figure 8:
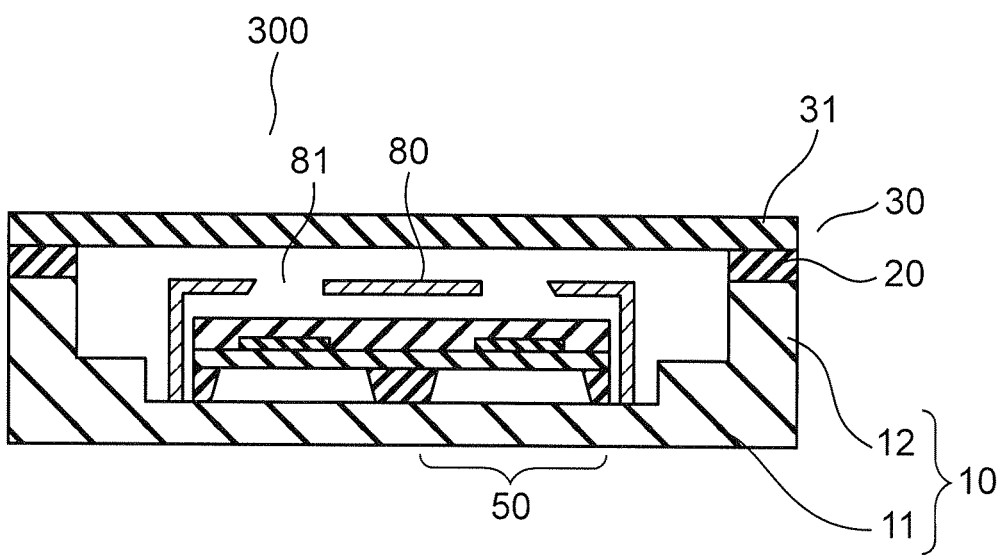
FIG. 8 is a cross sectional view of a wavelength selective infrared sensor according to embodiment 3 of the present disclosure.

FIG. 8 is a cross sectional view of a wavelength selective infrared sensor according to embodiment 3 of the present disclosure, generally denoted by 300. In FIG. 8, the same numerals as those used in FIG. 2 denote the same or corresponding elements.

The wavelength selective infrared sensor 300, in comparison with the wavelength selective infrared sensor 100 of embodiment 1, has a shielding structure 80 formed on the bottom portion 11 of the package 10 to cover the infrared detecting elements 50, instead of the shielding film 32 of the cap 30. The shielding structure 80 has a box shape configuration with four side faces and a top face in which a window 81 is formed. The shielding structure 80 is formed of metal such as aluminum.

The shielding structure 80 is formed by machine processing for instance. The window 81 is formed in such a manner that the infrared light rays that are not reflected on the cap 30 but pass through the cap 30 within the region of the windows 81 will impinge on thermal detector of the infrared detecting element 50.

Thus no infrared light rays are absorbed on the side wall of the thermal detector nor on the supporting leg, only the infrared light ray of a specific wavelength is absorbed by the absorber. Consequently a high-sensitivity wavelength selective infrared sensor with improved S/N ratio can be provided which eventually reduces noise signal components caused by the absorption of the unwanted infrared light rays having wavelength other than the specific wavelength.

Figure 9:
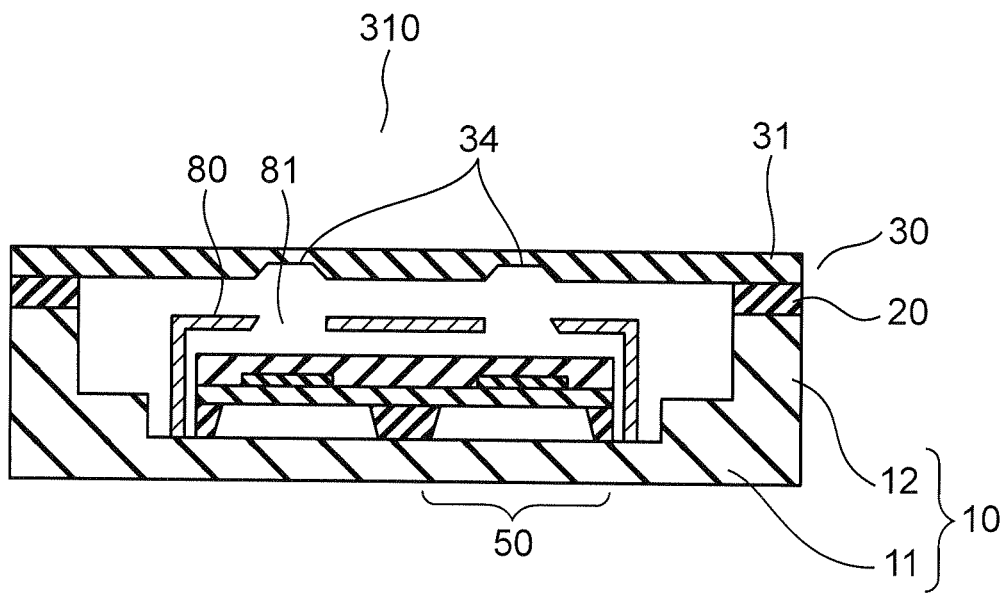
FIG. 9 is a cross sectional view of another wavelength selective infrared sensor according to embodiment 3 of the present disclosure.

FIG. 9 is a cross sectional view of a variation of the wavelength selective infrared sensor according to embodiment 3 of the present disclosure, generally denoted by 310. In FIG. 9, the same numerals as those used in FIG. 2 denote the same or corresponding elements.

The wavelength selective infrared sensor 310, in comparison with the wavelength selective infrared sensor 300, has a recess formed in the body 31 of the cap 30, so that the thickness of the body 31 is partially decreased. The recess 34 can be formed by wet etching of the body 31 using a photoresist as an etching mask, for example. The recess 34 is formed in such a manner that the infrared light rays that transmit through the recess 34 and pass through the window 81 of the shielding structure 80 will impinge on the thermal detector of the infrared detecting element 50.

In the infrared sensor 310, the amount of infrared absorption during the transmission of rays through the body 31 is decreased, so that the infrared transmittance can be increased. Consequently the high-sensitivity infrared sensor 310 can be obtained.

It is noted that the recess 34 may be formed on the front surface or both the front and rear surfaces, although, in the wavelength selective infrared sensor 310, the recess 34 is formed on the rear surface of the body 31 of the cap 30.

Figure 10:
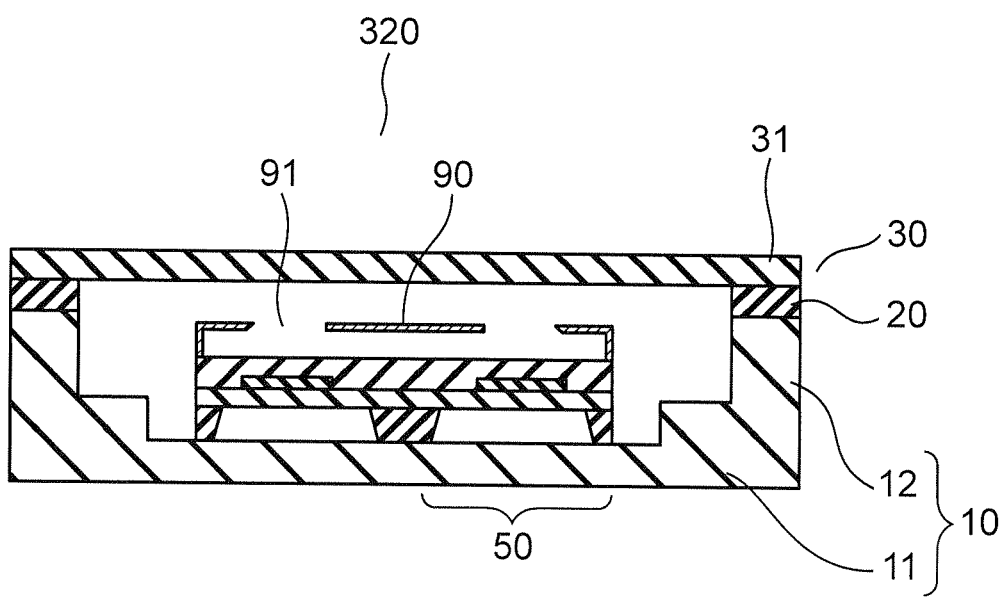
FIG. 10 is a cross sectional view of another wavelength selective infrared sensor according to embodiment 3 of the present disclosure.

FIG. 10 is a cross sectional view of another variation of the wavelength selective infrared sensor according to embodiment 3 of the present disclosure, generally denoted by 320. In FIG. 10, the same numerals as those used in FIG. 2 denote the same or corresponding elements.

The wavelength selective infrared sensor 320, in comparison with the wavelength selective infrared sensor 100 of embodiment 1, has a shielding structure 90 formed on the infrared detecting elements 50, instead of the shielding film 32 of the cap 30. The shielding structure 90 has a box shape with four side faces and a top face in which a window 91 is formed. The shielding structure 90 is formed of metal such as aluminum.

The shielding structure 90 is formed by the MEMS technique. According to MEMS technique, for example, a sacrificing layer is formed on the infrared detecting element 50 and then a metal layer is formed on top. Then, the sacrificing layer is removed to form the shielding structure 90. The window 91 is formed in such a manner that the infrared light rays that are not reflected on the cap 30 but pass through the window 91 will impinge on the thermal detector of the infrared detecting element 50.

Thus no infrared light rays are absorbed on the side wall of the thermal detector nor on the supporting leg, only the infrared light ray of a specific wavelength is absorbed by the absorber. Consequently a high-sensitivity wavelength selective infrared sensor with improved S/N ratio can be provided which eventually reduces noise signal components caused by the absorption of the unwanted infrared light rays having wavelength other than the specific wavelength.

Figure 11:
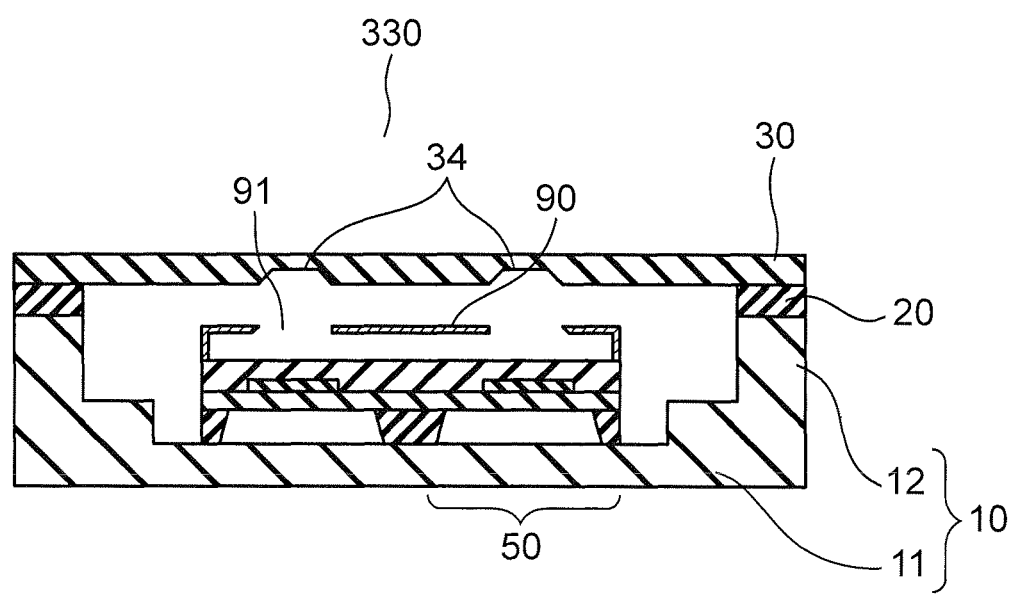
FIG. 11 is a cross sectional view of another wavelength selective infrared sensor according to embodiment 3 of the present disclosure.

FIG. 11 is a cross sectional view of a variation of yet another wavelength selective infrared sensor according to embodiment 3 of the present disclosure, generally denoted by 330. In FIG. 11, the same numerals as those used in FIG. 2 denote the same or corresponding elements.

The wavelength selective infrared sensor 330, in comparison with the wavelength selective infrared sensor 320, has the recess 34 additionally formed in the body 31 of the cap 30, so that the thickness of the body 31 is partially decreased. The recess 34 can be formed by wet etching of the body 31 using a photoresist as an etching mask, for example. The recess 34 is formed in such a manner that the infrared light rays that transmit through the recess 34 and pass through the window 91 of the shielding structure 90 will impinge on the thermal detector of the infrared detecting element 50.

In the infrared sensor 330, as the thickness of the body 31 is decreased in the recess 34, the amount of infrared absorption during the transmission of rays through the body 31 is decreased, so that the infrared transmittance can be increased. Consequently the high-sensitivity infrared sensor 330 can be obtained.

It is noted that the recess 34 may be formed on the front surface or both the front and rear surfaces, although, in the wavelength selective infrared sensor 330, the recess 34 is formed on the rear surface of the body 31 of the cap 30.

According to embodiments 1-3 of the present disclosure, a metal film having concave portions aligned periodically is used as an absorber 70, however, other types of metal film may be used, such as a metal film having convex portions aligned periodically, or a metal film having a dielectric film formed thereon with metal patterns formed periodically over the dielectric film to establish a MIM structure, as long as infrared light rays having a specific wavelength are absorbed by the generation of prasmon resonance. Furthermore, the absorber 70 may take such a structure that silicon nitride or silicon oxide is used as a dielectric material, and the optical path length from the front surface of the absorber 70 to the detecting film 56 is made equal to one fourth of the specific wavelength.

What is claimed is:

1. An infrared sensor for detecting infrared light rays of a specific wavelength, the infrared sensor comprising:
    a) a package;
    b) an infrared detecting element formed on the package, the infrared detecting element comprising:
        a thermal detector; and
        an absorber formed on the thermal detector which is configured to absorb infrared light rays of a specific wavelength, wherein the infrared light rays of the specific wavelength are detected by conversion of the infrared light rays into heat; and
    c) a cap formed on the package to cover the infrared detecting element, the cap comprising:
        a body having front and rear surfaces, through which the infrared light rays transmit; and
        a shielding film, with a window formed therein, provided on at least one of the front and rear surfaces of the body, wherein the infrared light rays are reflected by the shielding film other than a portion of the shielding film having the window, wherein
    every one of the infrared light rays passing through the window of the cap impinges on the absorber.

2. An infrared sensor for detecting infrared light rays of a specific wavelength, the infrared sensor comprising:
    a) a package;
    b) an infrared detecting element formed on the package, the infrared detecting element comprising:
        a thermal detector; and
        an absorber formed on the thermal detector which is configured to absorb infrared light rays of a specific wavelength, wherein the infrared light rays of the specific wavelength are detected by conversion of the infrared light rays into heat;
    c) a shielding structure, with a window formed therein, covering the infrared detecting element, wherein the infrared light rays pass through the window; and
    d) a cap formed on the package to cover the shielding structure, wherein
    every one of the infrared light rays passing through the window of the shielding structure impinges on the absorber.

3. An infrared sensor according to claim 1, wherein the absorber has a periodical structure thereon for generating plasmon resonance of infrared light rays of the specific wavelength so that the infrared light rays of the specific wavelength are selectively absorbed by the absorber.

4. An infrared sensor according to claim 1, wherein the absorber is a metal film having concave portions or convex portions aligned periodically.

5. An infrared sensor according to claim 1, wherein the absorber has a metal-insulator-metal (MIM) structure including a metal film, a dielectric film thereon and periodical metal patterns thereon.

6. An infrared sensor according to claim 1, wherein the cap is formed with a recess to present a portion thinner than the other portions of the cap, and the infrared light rays passing through the recess impinges on the absorber.

7. An infrared sensor array in which the infrared sensors according to claim 1 are arranged in a matrix format.

8. An infrared sensor according to claim 2, wherein the shielding structure is formed on a bottom portion of the package or on the infrared detecting element.

9. An infrared sensor according to claim 2, wherein the absorber has a periodical structure thereon for generating plasmon resonance of infrared light rays of the specific wavelength so that the infrared light rays of the specific wavelength are selectively absorbed by the absorber.

10. An infrared sensor according to claim 2, wherein the absorber is a metal film having concave portions or convex portions aligned periodically.

11. An infrared sensor according to claim 2, wherein the absorber has a metal-insulator-metal (MIM) structure including a metal film, a dielectric film thereon and periodical metal patterns thereon.

12. An infrared sensor according to claim 2, wherein the cap is formed with a recess to present a portion thinner than the other portions of the cap, and the infrared light rays passing through the recess impinges on the absorber.

13. An infrared sensor array in which the infrared sensors according to claim 2 are arranged in a matrix format.

14. The infrared sensor according to claim 1, wherein the window is configured such that infrared light rays which are incident on the window at a critical angle θ or less impinge on the absorber, and incident infrared light rays which are incident on the window at an angle greater than the critical angle θ are totally reflected, the critical angle θ being an angle between a transmission path of the infrared light rays and an axis perpendicular to a plane of the window.

* * * * *